United States Patent
Gauci et al.

(10) Patent No.: US 9,529,500 B1
(45) Date of Patent: Dec. 27, 2016

(54) APPLICATION RECOMMENDATION BASED ON DETECTED TRIGGERING EVENTS

(71) Applicant: Apple Inc., Cupertino, CA (US)

(72) Inventors: Jason J. Gauci, Cupertino, CA (US);
Lukas M. Marti, San Jose, CA (US);
Hyo Jeong Shin, Santa Clara, CA (US);
David R. Stites, San Jose, CA (US);
Liviu T. Popescu, Sunnyvale, CA (US);
Lili Cao, Sunnyvale, CA (US);
Matthaeus Krenn, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,359

(22) Filed: Jun. 5, 2015

(51) Int. Cl.
*G06F 3/0482* (2013.01)
*G06F 3/0484* (2013.01)
*G06N 5/04* (2006.01)
*G06F 9/44* (2006.01)
*G06N 99/00* (2010.01)

(52) U.S. Cl.
CPC ......... *G06F 3/0482* (2013.01); *G06F 3/04842* (2013.01); *G06F 3/04847* (2013.01); *G06N 5/04* (2013.01); *G06F 9/4443* (2013.01); *G06N 99/005* (2013.01)

(58) Field of Classification Search
CPC ............................ G06F 9/4443; G06N 99/005
USPC .......................................................... 715/765
See application file for complete search history.

(56) References Cited

U.S. PATENT DOCUMENTS

| | | | |
|---|---|---|---|
| 8,311,967 B1 * | 11/2012 | Lin | G06N 99/005 706/45 |
| 8,559,931 B2 | 10/2013 | Moon et al. | |
| 2007/0061735 A1 | 3/2007 | Hoffberg et al. | |
| 2008/0167923 A1 * | 7/2008 | Chowdhary | G06Q 10/063 705/7.36 |
| 2010/0306705 A1 * | 12/2010 | Nilsson | G06F 3/0488 715/835 |
| 2010/0318576 A1 | 12/2010 | Kim | |
| 2011/0035693 A1 | 2/2011 | Ueno et al. | |

(Continued)

FOREIGN PATENT DOCUMENTS

JP 2004152276 5/2004

OTHER PUBLICATIONS

Brandao, G., "Headphone Connect," Google play app, published Sep. 5, 2014, https://play.google.com/store/apps/details?id=com.brandao.headphoneconnect&hl=en, downloaded Jun. 8, 2015, 3 pages.

(Continued)

*Primary Examiner* — Jennifer To
*Assistant Examiner* — Ashley Fortino
(74) *Attorney, Agent, or Firm* — Kilpatrick Townsend & Stockton LLP

(57) ABSTRACT

An event can be detected by an input device. The event may be determined to be a triggering event by comparing the event to a group of triggering events. A first prediction model corresponding to the event is then selected. Contextual information about the device specifying one or more properties of the computing device in a first context is then received, and a set of one or more applications is identified. The set of one or more applications may have at least a threshold probability of being accessed by the user when the event occurs in the first context. Thereafter, a user interface is provided to a user for interacting with the set of one or more applications.

22 Claims, 8 Drawing Sheets

(56) References Cited

U.S. PATENT DOCUMENTS

| | | |
|---|---|---|
| 2011/0055758 A1 | 3/2011 | Lukasiak et al. |
| 2011/0119628 A1 | 5/2011 | Carter et al. |
| 2013/0290347 A1 | 10/2013 | Saib |
| 2014/0032678 A1 | 1/2014 | Koukoumidis et al. |
| 2014/0101472 A1* | 4/2014 | Rohrweck ............. G06F 1/3265 713/323 |
| 2014/0123022 A1* | 5/2014 | Lee ..................... G06F 9/44505 715/747 |
| 2015/0082242 A1 | 3/2015 | Antipa |
| 2015/0088422 A1* | 3/2015 | Nikovski ............... G01C 21/36 701/538 |
| 2015/0088662 A1* | 3/2015 | Noller .................... G06Q 30/02 705/14.66 |

OTHER PUBLICATIONS

Petzel C., "Plug in Launcher," Google play app, published Jul. 21, 2012, https://play.google.com/store/apps/details?id=com.launcher.plugin&hl=en, downloaded Jun. 8, 2015, 2 pages.

Yan, et al., "Fast App Launching for Mobile Devices Using Predictive User Context," MobiSys 2012 Proceedings of the 10$^{th}$ International Conference on Mobile Systems, Jun. 2012, 14 pages.

U.S. Appl. No. 14/732,287, filed Jun. 5, 2015 by Gauci et al. (Unpublished).

PCT/US2016/033952, "International Search Report and Written Opinion", mailed Aug. 31, 2016, 30 pages.

* cited by examiner

APPLICATION RECOMMENDATION BASED ON DETECTED TRIGGERING EVENTS

CROSS-REFERENCES TO RELATED APPLICATIONS

This application is related to commonly owned U.S. patent application entitled "Segmentation Techniques for Learning User Patterns to Suggest Applications Responsive to an Event on a Device" by Gauci et al. (U.S. application Ser. No. 14/732,287, filed Jun. 5, 2015), the disclosure of which is incorporated by reference in its entirety for all purposes.

BACKGROUND

Modern mobile devices (e.g., smartphones) may contain many applications. Each application may be designed to perform one or more specific functions. For instance, an application may be designed to play music or a video. As modern mobile devices become more integrated with modern day life, the number of applications stored on the mobile devices increases. It is not uncommon for modern mobile phones to have hundreds of applications. Having numerous applications may allow the mobile device to be particularly useful to the user; however, it may be difficult and time consuming for the user to find and run a desired application amongst all of the available applications.

BRIEF SUMMARY

Embodiments provide improved devices and methods for recommending an application based upon a triggering event. For example, certain events can be detected by a device and identified as a triggering event. Different triggering events can have different prediction models, which may allow for more accurate recommendations. A selected prediction model can use contextual information (e.g., collected before or after the event is detected) to identify an application for presenting to a user for easier access, e.g., allowing access on a lock screen.

In some embodiments, one or more input devices are monitored for a triggering event. When a triggering event is detected, contextual information may be gathered from one or more sources (e.g., another application of the device that has already obtained the contextual information). Contextual information may relate to a context of the device at or near the occurrence of the triggering event, such as location or time of day. Once the contextual information is received, historical information may then be gathered from a historical events database. The database may maintain a record of historical interactions between the user and the device. In light of the triggering event, the contextual information and historical information may be utilized to identify a set of one or more applications for a user. The identified application may then be suggested to the user by providing a user interface in a manner different than how, when, or where the identified application is normally accessed (e.g., on a home screen), thereby giving the user the option to run the application if desired.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
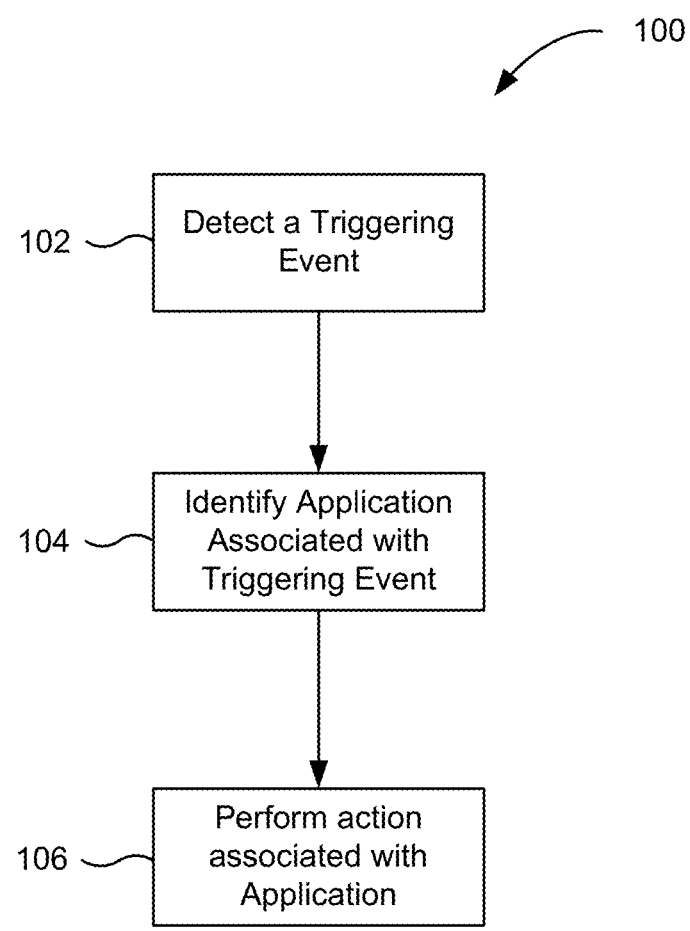
FIG. 1 is a flowchart of a method for identifying an application based upon a triggering event according to embodiments of the present invention.

A "user interface" corresponds to any interface for a user to interact with a device. A user interface for an application allows for a user to interact with the application. The user interface could be an interface of the application when the application is running. As another example, the user interface can be a system interface that provides a reduced set of applications for users to select from, thereby making it easier for a user to use the application.

A "home screen" is a screen of a device that appears when a device is first powered on. For a mobile device, a home screen often shows an array of icons corresponding to various applications that can be run on the device. Additional screens may be accessed to browse other applications not appearing on the home screen.

A "lock screen" is a screen that is shown when a user has not been authenticated, and therefore the device is locked from most usage. Some functionality can be exposed, e.g., a camera. In some embodiments, if a user interface corresponding to a suggested application is exposed on a lock screen, then some functionality associated with the suggested application can be obtained. For example, the application could be run. The functionality may be limited if the application is run from a lock screen, and the limited functionality may be expanded when the user is authenticated.

"Contextual information" refers collectively to any data that can be used to define the context of a device. The contextual information for a given context can include one or more contextual data, each corresponding to a different property of the device. The potential properties can belong to different categories, such as a time category or a location category. We contextual data is used as a feature of a model (or sub-model), the data used to train the model can include different properties of the same category. A particular context can correspond to a particular combination of properties of the device, or just one property.

DETAILED DESCRIPTION

Current mobile devices can have many applications stored on its solid state drive. In some cases, mobile devices can have hundreds of applications stored on its solid state drive. When a user wants to run an application on his mobile device, he or she must unlock the device, search through all of the applications in the device to identify the desired application, and then initiate execution of the application. Going through the process of finding the desired application can be excessively time consuming and redundant, especially for applications that are repeatedly used more often than others.

A user could pre-program a device to automatically perform a specified action of a predetermined application when a particular condition is satisfied (e.g., a triggering event occurs). For instance, the device can be programmed to suggested a predetermined application when a triggering event occurs. But, such operation is static and requires configuration by a user.

Instead of automatically suggesting a predetermined application, embodiments of the present invention can utilize a prediction model to suggest an application in a given context that is likely to be run by a user when a triggering event occurs. Different applications may be identified for different contexts for the same triggering events. As an example, one application can be suggested in a first context, but another application can be suggested in a second context.

Identifying an application that a user is likely to use has several benefits. A user interface can be provided to a user in an opportune manner or in an opportune screen, which can save time and streamline device operation. The user does not have to search through numerous applications to identify an application to use. A user interface of the application can be provided in various ways, which may depend on how high the probability is that a user will use the application. Further, the prediction model may provide a particular user interface if a particular action has a high probability of being performed. Thus, in some embodiments, the higher the probability of use, more aggressive action can be taken, such as automatically opening an application with a corresponding user interface (e.g., visual or voice command), as opposed to just providing an easier mechanism to open the application.

I. Application Prediction

Embodiments can suggest an application based upon a triggering event. For instance, a music application can be suggested when headphones are inserted into a headphone jack. In some embodiments, contextual information may be used in conjunction with the triggering event to identify an application to suggest to a user. As an example, when a set of headphones are inserted into a headphone jack, contextual information relating to location may be used. If the device is at the gym, for instance, application A may be suggested when headphones are inserted into the headphone jack. Alternatively, if the device is at home, application B may be suggested when the headphones are inserted into the headphone jack. Accordingly, applications that are likely to be used under certain contexts may be suggested at an opportune time, thus enhancing user experience.

FIG. 1 is a flow chart of a method 100 for suggesting an application based upon a triggering event according to embodiments of the present invention. Method 100 can be performed by a mobile device (e.g., a phone, tablet) or a non-mobile device and utilize one or more user interfaces of the device.

At block 102, a triggering event is detected. Not all events that can occur at a device are triggering events. A triggering event can be identified as sufficiently likely to correlate to unique operation of the device. A list of events that are triggering events can be stored on the device. Such events can be a default list and be maintained as part of an operating system, and may or may not be configurable by a user.

A triggering event can be an event induced by a user and/or an external device. For instance, the triggering event can be when an accessory device is connected to the mobile device. Examples include inserting headphones into a headphone jack, making a Bluetooth connection, and the like. In this example, each of these can be classified as a different triggering event, or the triggering event can collectively be any accessory device connecting to the mobile device. As other examples, a triggering event can be a specific interaction of the user with the device. For example, the user can move the mobile device in a manner consistent with running, where a running state of the device is a triggering event. Such a running state (or other states) can be determined based on sensors of the device.

At block 104, an application associated with the triggering event is identified. As an example, a music application can be identified when the headphones are inserted into the headphone jack. In some embodiments, more than one application can be identified. A prediction model can identify the associated application, where the prediction model may be selected for the specific triggering event. The prediction model may use contextual information to identify the application, e.g., as different application may be more likely to be used in different contexts. Some embodiments can identify applications only when there is a sufficient probability of being selected by a user, e.g., as determined from historical interactions of the user with the device. Various types of prediction models can be used. Examples of prediction models include neural networks, decision trees, multi-label logistic regression, and combinations thereof.

At block 106, an action is performed in association with the application. In an embodiment, the action may be the providing of a user interface for a user to select to run the application. The user interface may be provided in various ways, such as by displaying on a screen of the device, projecting onto a surface, or providing an audio interface.

In other embodiments, an application may run, and a user interface specific to the application may be provided to a user. Either of the user interfaces may be provided in response to identifying the application, e.g., on a lock screen. In other implementations, a user interface to interact with the application may be provided after a user is authenticated (e.g., by password or biometric). When the user interface is displayed, such a user interface would be more specific than just a home screen, i.e., a smaller list of suggested applications to run than are on the home screen. The user interface may be displayed immediately on the display of the device after the triggering event is detected. In other embodiments, the user interface may be displayed after the user provides some input (e.g., one or more click gestures), which may still be less user input (e.g., the number of clicks) than if no application was suggested.

II. Events Initiating Prediction

Triggering events may be a predetermined set of events that trigger the identification of one or more applications to provide to a user. The events may be detected using signals generated by device components. Further details of how a triggering event is detected is discussed in further detail herein.

Figure 2:
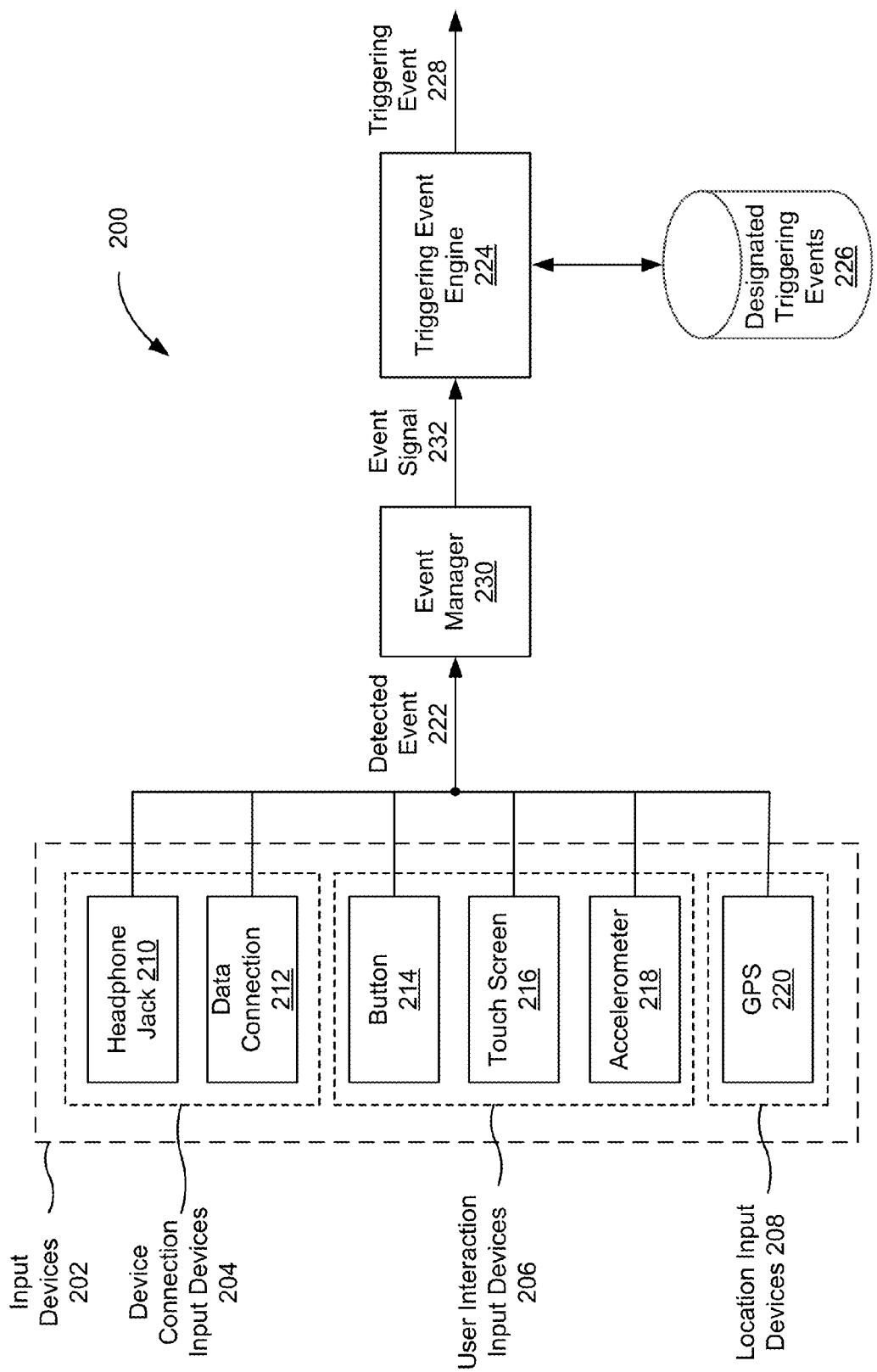
FIG. 2 shows a block diagram of a system for determining a triggering event according to embodiments of the present invention.

FIG. 2 illustrates a simplified block diagram of a detection system 200 for determining a triggering event according to embodiments of the present invention. Detection system 200 may reside within the device for which a triggering event is being determined. As shown, detection system 200 can detect a plurality of different events. One or more of the detected events may be determined by the detection system 200 to be triggering events. Other processing modules can then perform processing using a triggering event.

A. Detecting Events

In embodiments, detection system 200 includes hardware and software components for detecting events. As an example, detection system 200 may include a plurality of input devices, such as input devices 202. Input devices 202 may be any suitable device capable of generating a signal in response to an event. For instance, input devices 202 may include device connection input devices 204, user interaction input devices 206, and locational input devices 208 that can detect device connection events, user interaction events, and locational events, respectively. When an event is detected at an input device, the input device can send a signal indicating a particular event for further analysis.

In some embodiments, a collection of components can contribute to a single event. For example, a person can be detected to be running based on motion sensors and a GPS location device.

1. Device Connection Events

Device connection events may be events that occur when other devices are connected to the device. For example, device connection input devices 204 can detect events where devices are communicatively coupled to the device. Any suitable device component that forms a wired or wireless connection to an external device can be used as a device connection input device 204. Examples of device connection input device 204 include a headphone jack 210 and a data connection 212, such as a wireless connection circuit (e.g., Bluetooth, Wi-Fi, and the like) or a wired connection circuit (e.g., Ethernet and the like).

The headphone jack 210 allows a set of headphones to couple to a device. A signal can be generated when headphones are coupled, e.g., by creating an electrical connection upon insertion into headphone jack 210. In more complex embodiments, headphone jack 210 can include circuitry that provides an identification signal that identifies a type of headphone jack to the device. The event can thus be detected in various ways, and a signal generated and/or communicated in various ways.

Data connection 212 may communicatively couple with an external device, e.g., through a wireless connection. For instance, a Bluetooth connection may be coupled to a computer of a vehicle, or a computer of a wireless headset. Accordingly, when the external device is coupled to the mobile device via data connection 212, it may be determined that an external device is connected, and a corresponding device connection event signal may be generated.

2. User Interaction Events

User interaction input devices 206 may be utilized to detect user interaction events. User interaction events can occur when a user interacts with the device. In some embodiments, a user can directly activate a displayed user interface via one of user interaction input devices 206. In other embodiments, the user interface may not be displayed, but still is accessible to a user, e.g., via a user shaking a device or providing some other type of gesture. Further, the interaction may not include a user interface, e.g., when a state engine uses values from sensors of the device.

Any suitable device component of a user interface can be used as a user interaction input device 206. Examples of suitable user interaction input devices are a button 214 (e.g., a home or power button), a touch screen 216, and an accelerometer 218. For instance, button 214 of a mobile device, such as a home button, a power button, volume button, and the like, may be a user interaction input device 204. In addition, a switch such as a silent mode switch may be a user interaction input device 204. When the user interacts with the device, it may be determined that a user has provided user input, and a corresponding user interaction event may be generated. Such an event may depend on a current state of the device, e.g., when a device is first turned on or activated in the morning (or other long period of inactivity). Such information can also be used when determining whether an even is a triggering event.

Touch screen 216 may allow a user to provide user input via a display screen. For instance, the user may swipe his or her finger across the display to generate a user input signal. When the user performs the action, a corresponding user interaction event may be detected.

Accelerometer 218 or other motion sensors may be passive components that detect movement of the mobile device, such as shaking and tilting (e.g., using a gyrometer or compass). Such movement of a mobile device may be detected by an event manager 230, which can determine the movement to be of a particular type. The event manager 230 can generate an event signal 232 corresponding to the particular type of a user interaction event in a given state of the device. The state of the device may be determined by a state engine, further details of which can be found in U.S. Patent Publication No. 2012/0310587 entitled "Activity Detection" and U.S. Patent Publication No. 2015/0050923 entitled "Determining Exit From A Vehicle," the disclosures of which are incorporated by reference in their entirety.

One example is when a user is running, the accelerometer may sense the shaking and generate a signal to be provided to the event manager 230. The event manager 230 can analyze the accelerometer signal to determine a type of event. Once the type of event is determined, the event manager 230 can generate an event signal 232 corresponding to the type of event. The mobile device can move in such a manner as to indicate that the user is running Thus, this particular user interaction can be identified as a running event. The event manager 230 can then generate and send the event signal 232 indicating that a running event has been detected.

3. Locational Events

Locational input devices 208 may be used to generate locational events. Any suitable positioning system may be used to generate locational events. For instance, a global positioning system (GPS) may be used to generate locational events. Locational events may be events corresponding to a specific geographic location. As an example, if the mobile device arrives at a specific location, the GPS component may generate an input signal corresponding to a locational event. Typically, a mobile device may move to tens or even hundreds of locations per day, many of which may not be important enough to be considered as a location event. Thus, not every detected location will be a locational event. In embodiments, a locational event may be a location that is frequented more often than others. For instance, an event may be a locational event if it is frequented at least a threshold number of times in a period of time, e.g., five times in a span of six months to a year. Thus, important locations may be separated from unimportant locations and determined to be a locational event.

B. Determining Triggering Events

As further illustrated in FIG. 2, input devices 202 can output a detected event 222, e.g., as a result of any of the corresponding events. Detected event may include information about which input device is sending the signal for detected event 222, a subtype for a specific event (e.g., which type of headphones or type of data connection). Such information may be used to determine whether detected event 222 is a triggering event, and may be passed to later modules for determining which prediction model to use or which action to perform for a suggested application.

Detected event 222 may be received by an event manager 230. Event manager 230 can receive signals from input devices 202, and determine what type of event is detected. Depending on the type of event, event manager 230 may output signals (e.g., event signal 232) to different engines. The different engines may be have a subscription with the event manager 230 to receive specific event signals 232 that are important for their functions. For instance, triggering event engine 224 may be subscribed to receive event signals 232 generated in response to detected events 222 from input devices 202. Event signals 232 may correspond to the type of event determined from the detected events 222.

Triggering event engine 224 may be configured to determine whether the detected event 222 is a triggering event. To make this determination, triggering event engine 224 may reference a designated triggering events database 226, which may be coupled to the triggering event engine 224. The designated triggering events database 226 may include a list of predetermined events that are designated as triggering events.

Triggering event engine 224 may compare the received detected event 222 with the list of predetermined events and output a triggering event 228 if the detected event 222 matches a predetermined event listed in the designated triggering events database 226. An example the list of predetermined events may include any one or more of: (1) inserting headphones into a headphone jack, (2) connecting an external device via Bluetooth connection, (3) pressing a button after a period of time has elapsed (e.g., upon waking up in the morning), (4) sensing a certain type of movement of the device, and (5) arriving at a certain location. For (5), designated triggering events database 226 can include specifications of the certain location.

As described herein, one aspect of the present technology is the gathering and use of data available from various sources to suggest applications to a user. The present disclosure contemplates that in some instances, this gathered data may include personal information data that uniquely identifies or can be used to contact or locate a specific person. Such personal information data can include location-based data, home addresses, or any other identifying information.

The present disclosure recognizes that the use of such personal information data, in the present technology, can be used to the benefit of users. For example, the personal information data can be used to suggest an application that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can select not to provide location information for targeted content delivery services. In yet another example, users can select to not provide precise location information, but permit the transfer of location zone information.

III. Suggested Application Determination

Once a triggering event is detected, an application may be identified based on the triggering event. In some embodiments, identification of the application is not a pre-programmed action. Rather, identification of the application can be a dynamic action that may change depending on additional information. For instance, identification of the suggested application can be determined based on contextual information and/or historical information, as well as based on other information.

A. System for Determining Application Based on Triggering Event

Figure 3:
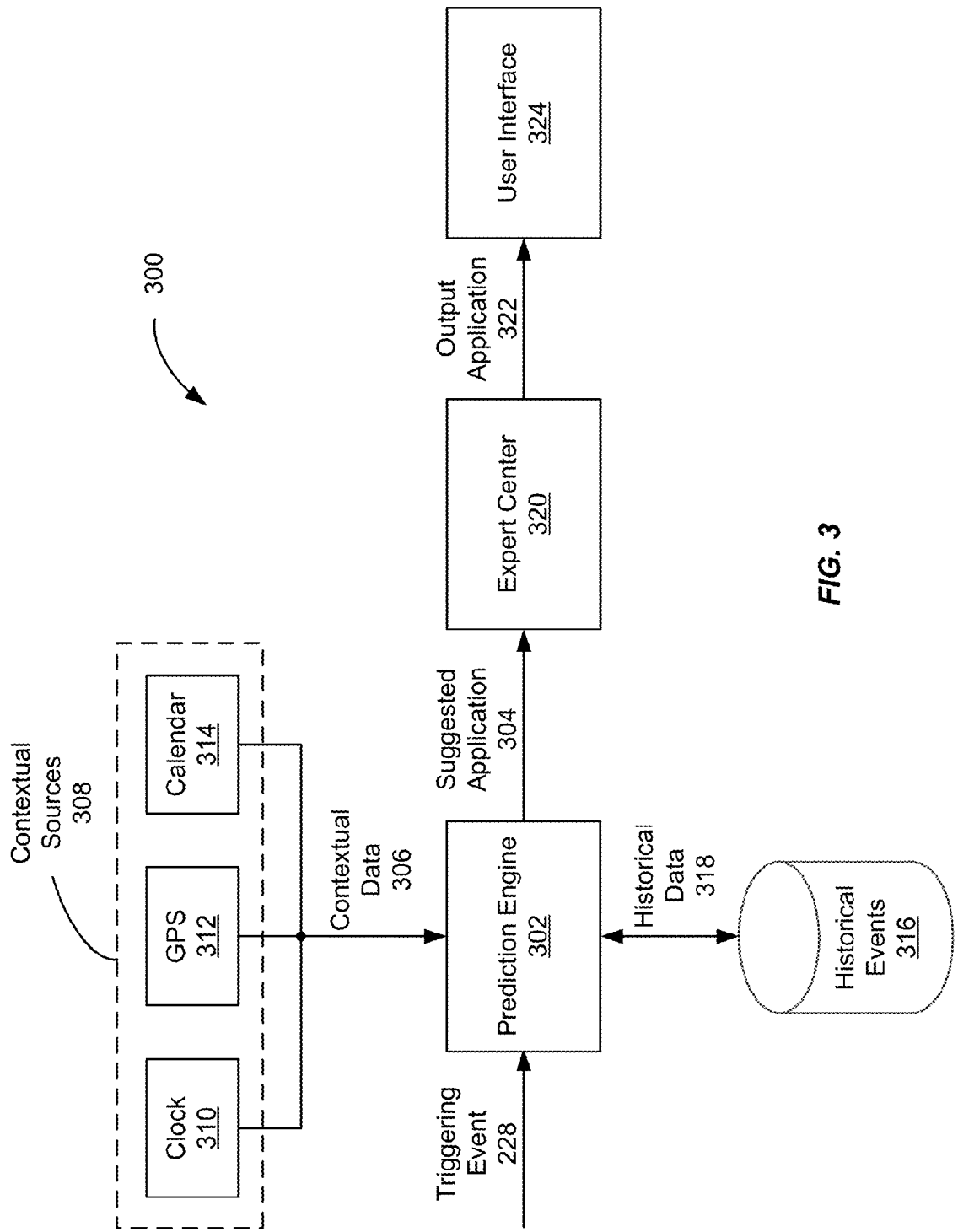
FIG. 3 shows a block diagram of a system for identifying an application for a user based on a triggering event according to embodiments of the present invention.

FIG. 3 illustrates a simplified block diagram of a prediction system 300 for identifying an application and a corresponding action command based upon a triggering event and contextual information according to embodiments of the present invention. Prediction system 300 resides within the device that is identifying the application. Prediction system 300 may include hardware and software components.

Prediction system 300 includes a prediction engine 302 for identifying the suggested application. Prediction engine 302 can receive a triggering event, such as the triggering event 228 discussed in FIG. 2. The prediction engine 302 may use information gathered from the triggering event 228 to identify a suggested application 304. As shown, the prediction engine 302 may receive contextual data 306 in addition to the triggering event 228. The prediction engine 302 may use information gathered from both the triggering event 228 and the contextual information 306 to identify a suggested application 304. Prediction engine 302 may also determine an action to be performed, e.g., how and when a user interface may be provided for a user to interact with a suggested application.

In certain embodiments, suggested application 304 may be any application existing on the mobile device's solid state drive. Prediction engine 302 may thus have the ability to suggest any application when a triggering event is detected. Alternatively, in embodiments, prediction engine 302 may have the ability suggest less than all of the applications when a triggering event is detected. For instance, a user may select some applications to be inaccessible to the prediction engine 302. Thus, the prediction engine 302 may not be able to suggest those applications when a triggering event is detected.

1. Contextual Information

Contextual information may be gathered from contextual data 306. In embodiments, contextual information may be received at any time. For instance, contextual information may be received before and/or after the triggering event 228 is detected. Additionally, contextual information may be received during detection of the triggering event 228. Contextual information may specify one or more properties of the device for a certain context. The context may be the surrounding environment (type of context) of the device when the triggering event 228 is detected. For instance, contextual information may be the time of day the triggering event 228 is detected. In another example, contextual information may be a certain location of the device when the triggering event 228 is detected. In yet another example, contextual information may be a certain day of year at the time the triggering event 228 is detected. Additionally, contextual information may be data gathered from a calendar. For instance, the amount of time (e.g., days or hours) between the current time and an event time. Such contextual information may provide more meaningful information about the context of the device such that the prediction engine 302 may accurately suggest an application that is likely to be used by the user in that context. Accordingly, prediction engine 302 utilizing contextual information may more accurately suggest an application to a user than if no contextual information were utilized.

Contextual data 306 may be generated by contextual sources 308. Contextual sources 308 may be components of a mobile device that provide data relating to the current situation of the mobile device. For instance, contextual sources 308 may be hardware devices and/or software code that operate as an internal digital clock 310, GPS device 312, and a calendar 314 for providing information related to time of day, location of the device, and day of year, respectively. Other contextual sources may be used.

Gathering the contextual data 306 for the prediction engine 302 may be performed in a power efficient manner. For example, continuously polling the GPS 312 to determine the location of the device may be excessively power intensive, which may decrease battery life. To avoid decreasing battery life, prediction engine 302 may determine the location of the device by requesting the device's location from sources other than the GPS 312. Another source for locational information may be an application that has recently polled the GPS 312 for the device's location. For instance, if application A is the most recent application that has polled the GPS 312 for the device's location, the prediction engine 302 may request and receive locational data from application A rather than separately polling the GPS 312.

2. Historical Information

In addition to the contextual sources 308, a historical events database 316 may also be utilized by the prediction engine 302 in certain embodiments. The historical events database 316 may include historical information of prior interactions between the user and the mobile device after a triggering event is detected.

The historical events database 316 may keep a record of the number of times an application was opened following a certain triggering event. For instance, the database 316 may keep a record indicating that a user opens application A eight out of ten times after headphones are plugged into the headphone jack. Accordingly, the prediction engine 302 may receive this information as historical data 318 to determine whether application A should be identified for the user when a set of headphones are inserted into the headphone jack.

The historical events database 316 may also keep a record of the number of times an application was opened under different contexts when the triggering event is detected. For example, the database 316 may keep a record indicating that a user opens application A nine out of ten times after the headphones are inserted into the headphone jack when the user is at home, and one out of the ten times when the user is at the gym. Accordingly, the prediction engine 302 may receive this information as historical data 318 and determine that application A should be identified when headphones are inserted into the device at home, but not at the gym. It is to be appreciated that although examples discussed herein refer to locations as "home" or "gym," contextual data 306 representing "home" or "gym" may be in the form of numerical coordinates. One skilled in the art understands that information relating to time of day and day of year may be utilized instead of location in a similar manner to identify other applications.

Historical events database 316 may also keep a record of how often, and under what circumstances, the user decides not to run the identified application. For instance, the database 316 may keep a record indicating that the user did not select application B two out of ten times it was suggested to the user when the user inserted the headphones into the device at home. Accordingly, the prediction engine 302 may receive this information as historical data 318 to adjust the probability of suggesting application B when the user inserts the headphones into the device at home.

In some embodiments, contextual information 306 and/or historical information (further discussed herein) may be unavailable or limited when a triggering event is detected. In such cases, a default application may be suggested when a triggering event is detected. The default application may be a type of application that is commonly associated with the type of triggering event. For instance, a music application may be suggested if a set of headphones are inserted into the headphone jack. Alternatively, a maps application may be suggested when a Bluetooth connection is made with a car. Once more historical information is obtained, a suggested application can be provided instead of a default application.

B. Multiple Prediction Models

As different triggering events can result in different suggested applications, embodiments can use a different prediction model for different triggering events. In this manner, a prediction model can be refined to provide a more accurate suggestion for a particular triggering event.

Figure 4:
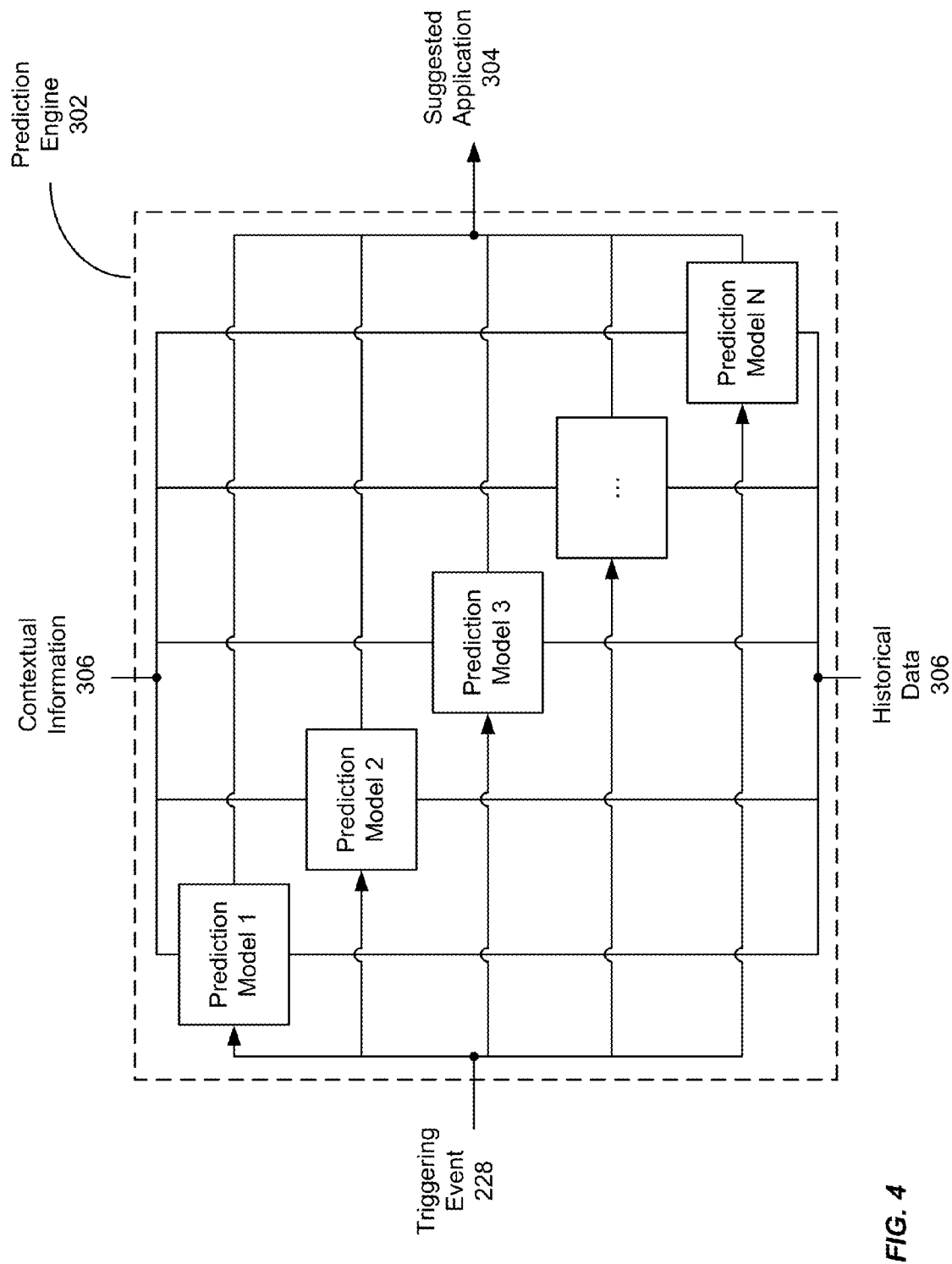
FIG. 4 shows a block diagram of a system for identifying an application with multiple prediction models according to embodiments of the present invention.

FIG. 4 illustrates in more detail the prediction engine 302 according to embodiments of the present invention. The prediction engine 302 may be program code stored on a memory device. In embodiments, the prediction engine 302 includes one or more prediction models. For example, prediction engine 302 may include prediction models 1 through N. Each prediction model may be a section of code and/or data that is specifically designed to identify an application for a specific triggering event 228. For instance, prediction model 1 may be specifically designed to identify an application for a triggering event where a set of headphones are inserted into a headphone jack. Prediction model 2 may be designed to identify an application for a triggering event where a Bluetooth device is connected.

Prediction model 3 may be designed to identify an application for a triggering event where a user interacts with a user interface of the device after an elongated period of time (e.g., when the user first interacts with the mobile device after waking up in the morning). Other prediction models may be designed to identify an application for a triggering event associated with a certain pattern of detected motion (e.g., when the user is running with the mobile device), an arrival at a specific location, and a selection of a particular application (e.g., selecting an application that communicates with the computer of a car). Any number of prediction models may be included in the prediction engine 302 depending on the number of triggering events 228.

As shown, each prediction model 1 through N may be coupled to the contextual sources and the historical events database to receive contextual data 306 and historical data 318. Accordingly, each prediction model my utilize contextual data 306 and historical data 318 to identify a suggested application 304 according to embodiments discussed herein.

With reference back to FIG. 3, the prediction engine 302 may send the suggested application 304 to an expert center module 320. In embodiments, the event manager 320 may be a section of code that manages what is displayed on a device, e.g., on a lock screen, when a search screen is opened, or other screens. For instance, the expert center 320 may coordinate which information is displayed to a user, e.g., a suggested application, suggested contact, and/or other information. Expert center 320 can also determine when to provide such information to a user.

IV. User Interface

If the event manager 320 determines that it is an opportune time for the suggested application to be outputted to the user, the event manager 320 may output an application 322 to a user interface 324. In embodiments, the output application 322 may correspond to the suggested application 304. The user interface 324 may communicate the output application 322 to the user and solicit a response from the user regarding the output application 322.

In embodiments, the user interface 324 may be a combination of device components with which the user may interact. For instance, the user interface 324 may be a combination of device components that has the ability to output information to a user and/or allow a user to input signals to the device.

A. Display

User interface 324 can be displayed on a display of the device. The display may be sensitive to touch such that input signals can be generated by physical interaction with the display. In such embodiments, the display may include a touch-sensitive layer superimposed on an image display layer to detect a user's touch against the display. Accordingly, the display may be a part of the user interface 324 that can both output information to a user and input information from a user. As an example, the display may show an icon for a suggested application, and input a signal to run the application when the user taps a corresponding location of the display panel.

Modern devices have security measures that prevent unauthorized use of the device. Such devices may require a user to unlock the device before the user can access all of the applications stored on the device. The device may limit accessibility of all the applications depending on a state of device security. For instance, the device may require a user to unlock the device before the device allows access to all of its applications. An unlocked device may have a display that shows a home screen. The home screen may display and/or provide access to all applications of the device. A locked device, however, may have a display that shows a lock screen. Some regions of the display may be occupied by a prompt for unlocking the device. Accordingly, the lock screen may allow interaction with fewer applications than the home screen due to the heightened state of device security and the limited display space. For instance, the lock screen may only allow access to less than all of the applications of the device, such as one to three applications. In some embodiments, suggested applications 304 as discussed herein with respect to FIG. 3 may be displayed on the lock screen.

B. Other Input and Output Device Components

Although the display may be a part of the user interface 324 that is capable of both outputting information to a user and inputting information from a user, other parts of the user interface 324 are not so limited. For instance, other device components that can input information from a user are envisioned in embodiments herein as well. As an example, buttons and switches can be a part of the user interface 324. A button may be a device component that generates an input when a user applies pressure upon it. A switch may be a device component that generates an input when a user flips a lever to another position. Accordingly, the button and/or switch may be activated by a user to run a suggested application 304 according to embodiments discussed herein.

Device components that can output information from a user are envisioned in embodiments herein as well. As an example, a speaker or a haptic device may be a part of the user interface that outputs information to a user. The speaker may output an audio notification to indicate that an identified application has been suggested. The haptic device may output a tactile notification to indicate that an identified application has been suggested. It is to be appreciated that such devices are mere embodiments, and that other embodiments are not limited to such devices.

C. Level of Interaction

User interface 324 may require different levels of interaction in order for a user to run the output application 322. The various levels may correspond to a degree of probability that the user will run the suggested application 304. For instance, if the prediction engine 302 determines that the suggested application 304 has a probability of being run by the user that is greater than a threshold probability, the user interface 324 may output a prompt that allows the user to more quickly run the application by skipping intermediate steps.

As an example, if the prediction engine 302 determines that the probability of the user running the suggested music application is greater than a high threshold probability, the suggested music application may be automatically run, and the user interface 324 may thus display controls, e.g. play, pause, and fast forward/reverse, for the music application. The user therefore may not have to perform the intermediate step of clicking to run the application.

Alternatively, if the prediction engine 302 determines that the probability of the user running the music application is less than the high threshold probability but still higher than a lower threshold probability, the music application may be displayed as an icon. The lower threshold probability may be higher than a baseline threshold probability. The baseline threshold probability may establish the minimum probability at which a corresponding application will be suggested. The user may thus have to perform an extra step of clicking on the icon to run the suggested music application. However, the number of clicks may still be less than the number of clicks required when no application is suggested to the user. In embodiments, the threshold probability may vary according to application type. In various embodiments, the high threshold probability may range between 75% to 100%, the lower threshold probability may range between 50% to 75%, and the baseline threshold may range between 25% to 50%. In a particular embodiment, the high threshold probability is 75%, the lower threshold probability is 50%, and the baseline probability is 25%.

In embodiments, higher probabilities may result in more aggressive application suggestions. For instance, if an application has a high probability of around 90%, the prediction engine 302 may provide an icon on a lock screen of the device to allow the user to access the application with one click of the icon. If an application has an even higher probability of around 95%, the prediction engine 302 may even automatically run the suggested application for the user without having the user click anything. In such instances, the prediction engine 302 may not only output the suggested application, but also output a command specific to that application, such as a command to play the selected music in a music application or a command to initiate guidance of a specific route in a map application.

According to embodiments of the present invention, the prediction engine 302 may determine what level of interaction is required, and then output that information to the event manager 320. The event manager 320 may then send this information to the user interface 324 to output to the user.

In embodiments, the user interface 324 may display a notice to the user on a display screen. The notice may be sent by a push notification, for instance. The notice may be a visual notice that includes pictures and/or text notifying the user of the suggested application. The notice may suggest an application to the user for the user to select and run at his or her leisure. When selected, the application may run. In some embodiments, for more aggressive predictions, the notification may also include a suggested action within the suggested application. That is, a notification may inform the user of the suggested application as well as a suggested action within the suggested application. The user may thus be given the option to run the suggested application or perform the suggested action within the suggested application. As an example, a notification may inform the user that the suggested application is a music application and the suggested action is to play a certain song within the music application. The user may indicate that he or she would like to play the song by clicking on an icon illustrating the suggested song. Alternatively, the user may indicate that he or she would rather run the application to play another song by swiping the notification across the screen.

Other than outputting a suggested application and a suggested action to the user interface 324 in one notification, prediction engine 302 may output two suggested actions to the user interface 324 in one notification. For instance, prediction engine 302 may output a suggested action to play a first song, and a second suggested action to play a second song. The user may choose which song to play by clicking on a respective icon in the notification. In embodiments, the suggested actions may be determined based on different criteria. For instance, one suggested action may be for playing a song that was most recently played regardless of contextual information, while the other suggested action may be for playing a song that was last played under the same or similar contextual information. As an example, for the circumstance where a user enters into his or her car and the triggering event causes the prediction engine 302 to suggest two actions relating to playing a certain song, song A may be a song that was last played, which happened to be at home, while song B may be a song that was played last time the user was in the car. When the user selects the song to be played, the song may continue from the beginning or continue from where it was last stopped (e.g., in the middle of a song).

In order for prediction engine 302 to be able to suggest an action, prediction engine 302 may have access to a memory device that stores information about an active state of the device. The active state of a device may represent an action that is performed following selection of the suggested application. For instance, an active state for a music application may be playing a certain song. The active state may keep track of when the song last stopped. In embodiments, historical database 316 from FIG. 3 may record historical data pertaining to the active state of the device. Accordingly, the prediction engine 302 may suggest an action to be run by the suggested application.

V. Method of Determining Suggested Application

Figure 5:
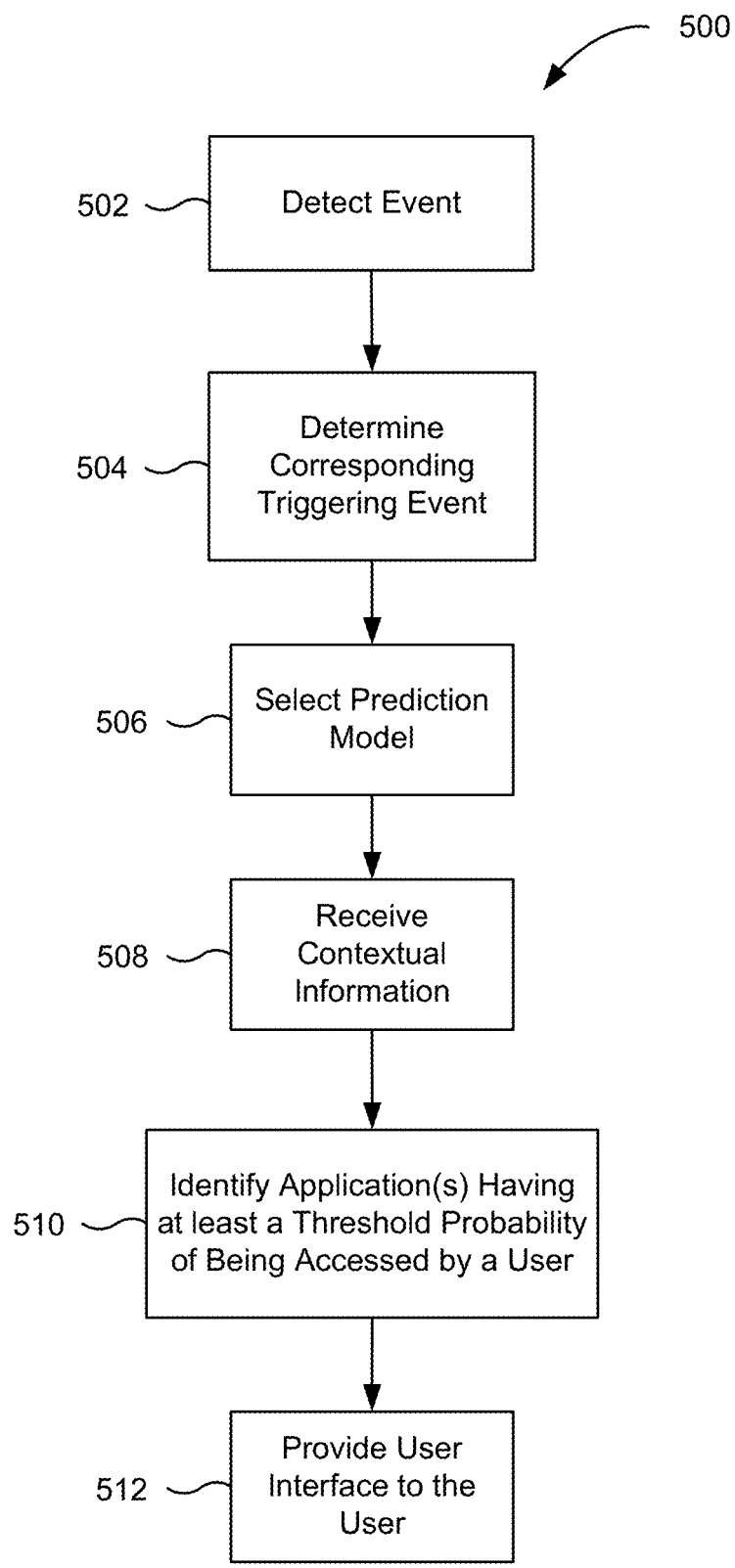
FIG. 5 is a flowchart of a method of identifying an application based on a triggering event with a device according to embodiments of the present invention.

FIG. 5 is a flow chart illustrating a method 500 of identifying an application based upon a triggering event according to embodiments of the present invention. Method 500 can be performed entirely or partially by the device. As various examples, the device can be a phone, tablet, laptop, or other mobile device as already discussed herein.

At block 502 the device, e.g., a mobile device, detects an event. For example, a set of headphones may be inserted into a headphone jack of the device. As another example, a wireless headset may be coupled to the device via a Bluetooth connection. Input devices 202 in FIG. 2 may be used to detect the event. The event may be any action where the mobile device interacts with an external entity such as an external device or a user.

At block 504, the device determines whether the detected event is a triggering event. To determine whether the detected event is a triggering event, the detected event may be compared to a predetermined list of events, e.g., the list of events in the designated triggering events database 226 in FIG. 2. If the detected event matches one of the predetermined list of events, then the detected event may be determined to be a triggering event.

At block 506, the device selects a prediction model, e.g., one of the prediction models 1 through N in FIG. 4. The selected prediction model may depend on the triggering event. For instance, a prediction model designed for Bluetooth connections may be selected when the triggering event relates to establishing a Bluetooth connection with an external device. As another example, a prediction model designed for headphone connections may be selected when the triggering event relates to inserting a set of headphones into a headphone jack.

At block 508, the device receives contextual information. Contextual information may be received from a variety of sources, e.g., the contextual sources 308 in FIG. 3. In embodiments, contextual information may relate to the surrounding situation of the device. For instance, contextual information may relate to the time of day, day of year, or the location of the device. Additionally, historical information may be received by the device as well. Historical information may relate to a history of interactions between the device and a user stored in a database, e.g., historical events database 316.

At block 510, the device may identify one or more applications that have at least a threshold probability of being accessed by the user. As already mentioned herein, there may be a plurality of thresholds. In some embodiments, the threshold probability may be a baseline threshold probability, a lower threshold probability, or a high threshold probability. For example, one or more applications can each have a probability of greater than the threshold probability. In another example, the one or more applications can have a combined probability of greater than the threshold probability. The one or more applications may be the applications that have the top probabilities, and may be selected to various criteria (e.g., all having a probability greater than the threshold, as many applications as needed to get above threshold but limited to a maximum number, etc.) In some embodiments, applications that have a probability of less than the baseline threshold probability may be ignored.

The probability of being accessed by a user may be determined by the prediction model. The prediction model may determine the probability by utilizing contextual information as well as historical information. In embodiments, the identified applications are the applications discussed herein with respect to FIGS. 3 and 4.

In some embodiments, if applications have equal probabilities, then they may be ignored, i.e., not identified. In these situations, the device may need to generate additional historical information to properly identify the one or more applications. As more historical information is gathered, the more accurate the device becomes at identifying the correct application, e.g., the application desired to be accessed by the user in a given context. In other embodiments, both the applications can be provided, e.g., if their combined probability is sufficiently high, as may occur of both application have the top two probabilities.

At block 512, the device may provide a user interface to the user. For example, the device may display the identified applications to the user via an interface with which the user may interact to indicate whether the user would like to access the identified applications. For instance, the user interface may include a touch-sensitive display that shows the user one or more of the identified applications, and allows the user to access one or more of the applications identified by the device by interacting with the touch-sensitive display.

In certain embodiments, the user interface may be provided in a lock screen, or a home screen. The home screen may be a screen displayed after pressing a home button in an unlocked state. The lock screen may be a screen displayed after pressing a home button after a prolonged period of inactivity to wake up the device. In embodiments, the lock screen has less available display space for displaying applications than the home screen because a portion of the lock screen is reserved for unlocking the device. In some embodiments, the user interface may be associated with an already running application. As an example, the user interface may be a music player interface having audio controls associated with a running music application, as illustrated in FIG. 6.

Figure 6:
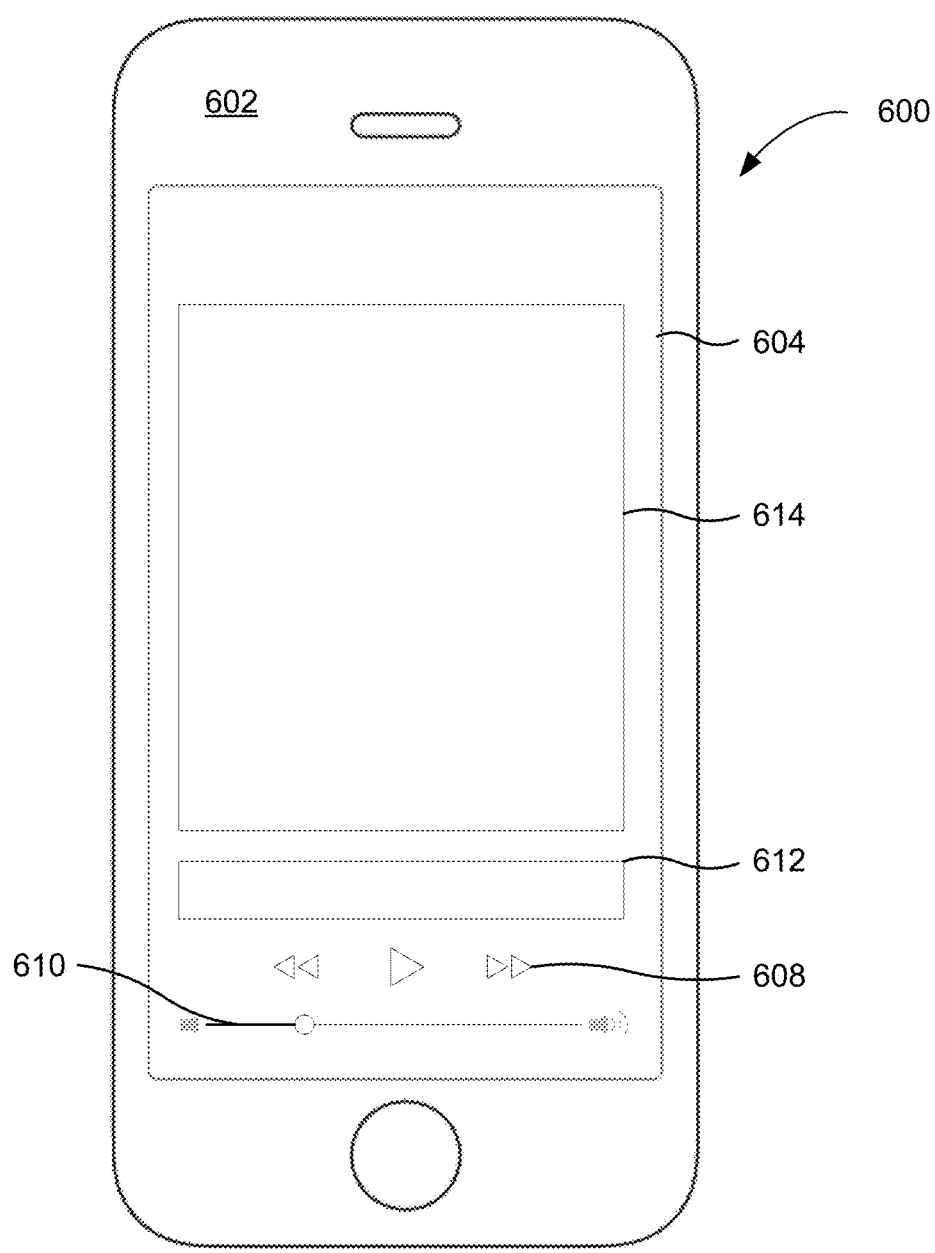
FIG. 6 is a simplified diagram of a device having a user interface for a music application according to embodiments of the present invention.

FIG. 6 illustrates an exemplary user interface 600 for a device 602 that is associated with an already running application. User interface 600 may be a user interface for a music application, although other user interfaces for different applications are envisioned herein as well. User interface 600 may be provided by a touch-screen display 604. Touch-screen display 604 may display audio controls 608, volume controls 610, song title 612, and/or album art 614. Audio controls 608 may provide a user interface for fast forwarding, rewinding, playing, and pausing a song. Volume controls 610 allow a user to adjust the volume of the outputted acoustics. Song title 612 and album art 614 may display information about the song that is currently playing. In embodiments, when the user interface 600 is displayed by the touch-screen display 604, a backlight of the device 602 may be illuminated. Illumination of the backlight allows the user to see the running application and be aware that the device 602 has run a suggested application. By automatically running the music application and providing user interface 600 to a user, the device 602 may enhance the user experience by allowing the user to access his or her desired application without having to click one or more icons.

Portions of the user interface 600 may be hidden in some situations. For instance, if an expert center, such as the expert center 320 in FIG. 3, of the device 602 decides that another application has priority over the suggested application, the album art 614 may be hidden and the other application may be displayed instead. The other application may be displayed as an accessible icon on the display 604 for running the other application. In other embodiments, the other application may be displayed as a notification that allows access to the icon of the other application when the user clicks on the notification. In such situations, the notification would be displayed in lieu of the album art 614. In embodiments, if the user interface is displayed on the lock screen, then the notification may be displayed on the lock screen as well. Accordingly, the user may be made aware of, and given the opportunity to run, the application that is deemed to have higher priority.

VI. Time Limit for Running Application

In embodiments, if the identified application is not accessed in a certain period of time, the device may remove the user interface as if no user interface was provided in the first place. If the user does not access the application within a certain period of time, it is assumed that the user is not interested in accessing the application. Thus, the user interface is removed so that the user cannot access the identified application, and the user is not distracted.

Figure 7A:
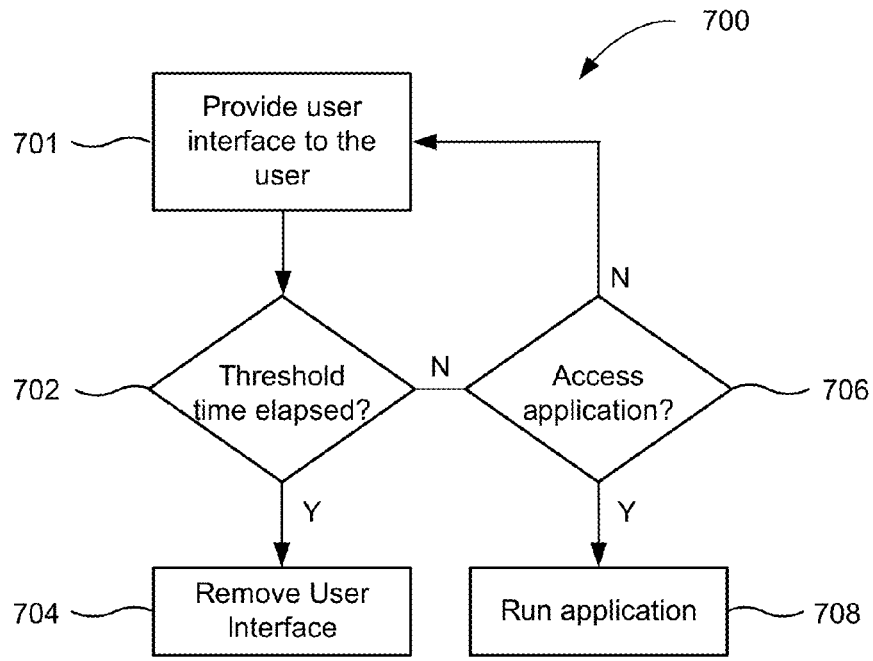
FIGS. 7A and 7B are flowcharts of methods for removing an identified application from a user interface according to embodiments of the present invention.
Figure 7B:
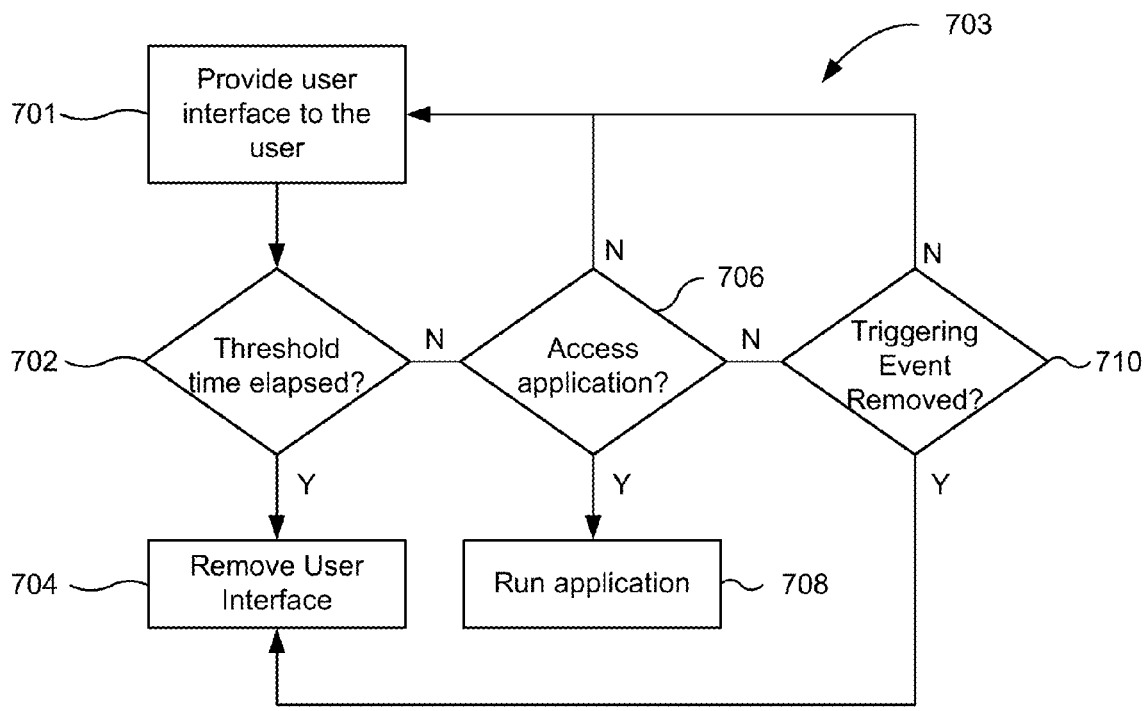

FIGS. 7A and 7B are flowcharts illustrating methods for removing the user interface according to embodiments. Specifically, FIG. 7A is a flow chart illustrating a method 700 for removing the user interface after a period of time has elapsed. FIG. 7B is a flow chart illustrating a method 703 for removing the user interface after a triggering event has been removed within a threshold period of time. The methods 700 and 703 can be performed entirely or partially by the device.

With reference to FIG. 7A, method 700 begins by providing a user interface to the user at block 701. Block 701 may be performed as mentioned at block 512 discussed herein with respect to FIG. 5.

At block 702, the device determines whether a threshold period of time has elapsed since the user interface was first provided to the user. The user interface may be provided to the user in either a locked screen or a home screen. In embodiments, the threshold period of time represents a predetermined period of time beginning immediately after providing the user interface to the user where the user has not interacted with the device.

The threshold period of time may vary depending on the type of triggering event. For instance, if the triggering event is a type of event that involves direct user interaction (e.g., a cognizant action by a user intended to bring about an event), then the threshold period of time may be relatively short, such as 15 to 30 seconds. An example of such a triggering event includes insertion of a set of headphones into a headphone jack. An another example includes waking up the device by pressing a button after a prolonged period of time. The threshold period of time can be relatively short because it may be assumed that the user is directly interacting with the phone and may be immediately aware of the outputted identified application. Because the user is immediately aware of the identified application, a passage of a short period of time where the identified application is not accessed indicates that the user does not intend to access the identified application.

Alternatively, if the triggering event is a type of event that does not involve direct user interaction, then the threshold period of time may be longer than the threshold period of time for a triggering event involving direct user interaction. In an embodiment, the threshold period of time for a triggering event that does not involve direct user interaction may be relatively long, such as 15 to 30 minutes. One such example includes arriving at a location. When a device arrives at a specific location, it is assumed that the user is traveling and is not focused on the device. The user may not be immediately aware of the outputted identified application. Thus, more time may pass before the user checks the device and becomes aware of the identified application.

At block 704, if the threshold period of time elapses, then the user interface may be removed such that the user may not have realized that an application was suggested at all. However, if the threshold period of time has not elapsed, then at block 706, the device determines whether the user would like to access the application. The user may indicate that he or she would like to access the application by any form of user input via the user interface, such as by interacting with a touch screen, pressing a button, flipping a switch, or using a biometric device.

If it is determined that the user has not yet indicated his or her desire to access the application, then the device may continue to provide the user interface to the user at block 701. However, if the device receives an indication that the user would like to access the application, then at block 708, the device may run the application. Accordingly, the device may save the user time by providing a short cut to the desired application, thereby enhancing the user's experience.

In some embodiments, the user interface may be removed prior to the duration of the threshold period of time. As illustrated in FIG. 7B, at block 710, the device determines whether the triggering event has been removed, e.g., an action opposite of the triggering event has been detected. For instance, if the triggering event is inserting a set of headphones into a headphone jack, then removal of the triggering event is pulling out the set of headphones from the headphone jack. In another example, if the triggering event is establishing a Bluetooth connection, then removal of the triggering event is disconnecting the Bluetooth connection. Removal of the triggering event can be interpreted by the device to mean that the user does not intend to access the suggested device. Accordingly, if the triggering event is removed, the user interface may be removed at block 704, e.g., the application may be cleared and any user interface for the application may be hidden.

VII. Training Routine

As historical information accumulates through use of the mobile device, prediction models (e.g., predictions models 1-N discussed in FIG. 4) may be periodically trained (i.e., updated) in consideration of the new historical information. After being trained, prediction models 1-N may more accurately suggest applications and actions according to the most recent interaction patterns between the user and the mobile device. Training prediction models 1-N may be most effective when a large amount of historical information has been recorded. Thus, training may occur at intervals of time long enough to allow the mobile device to detect a large number of interactions with the user. However, waiting too long of a period of time between training sessions may hinder adaptability of the prediction engine. Thus, a suitable period of time between training sessions may be between 15 to 20 hours, such as 18 hours.

Training prediction models 1-N may take time and may interfere with usage of the mobile device. Accordingly, training may occur when the user is most unlikely going to use the device. One way of predicting that the user will not use the device is by waiting for a period of time when the device is not being used, e.g., when no buttons are pressed and when the device is not moving. This may indicate that the user is in a state where the user will not interact with the phone for a period of time in the near future, e.g., when the user is asleep. Any suitable duration may be used for the period of time of waiting, such as one to three hours. In a particular embodiment, the period of time of waiting is two hours.

At the end of the two hours, prediction models 1-N may be updated. If, however, the user interacts with the mobile device (e.g., presses a button or moves the device) before the end of the two hours, then the two hour time period countdown may restart. If the time period constantly restarts before reaching two hours of inactivity, then the mobile device may force training of prediction models 1-N after an absolute period of time. In an embodiment, the absolute period of time may be determined to be a threshold period of time at which user friendliness of the mobile device begins to decline due to out-of-date prediction models. The absolute period of time may range between 10 to 15 hours, or 12 hours in a particular embodiment. Accordingly, the maximum amount of time between training may be between 28 hours (18+10 hours) to 33 hours (18+15 hours). In a particular embodiment, the maximum amount of time is 30 hours (18+12 hours).

VIII. Example Device

Figure 8:
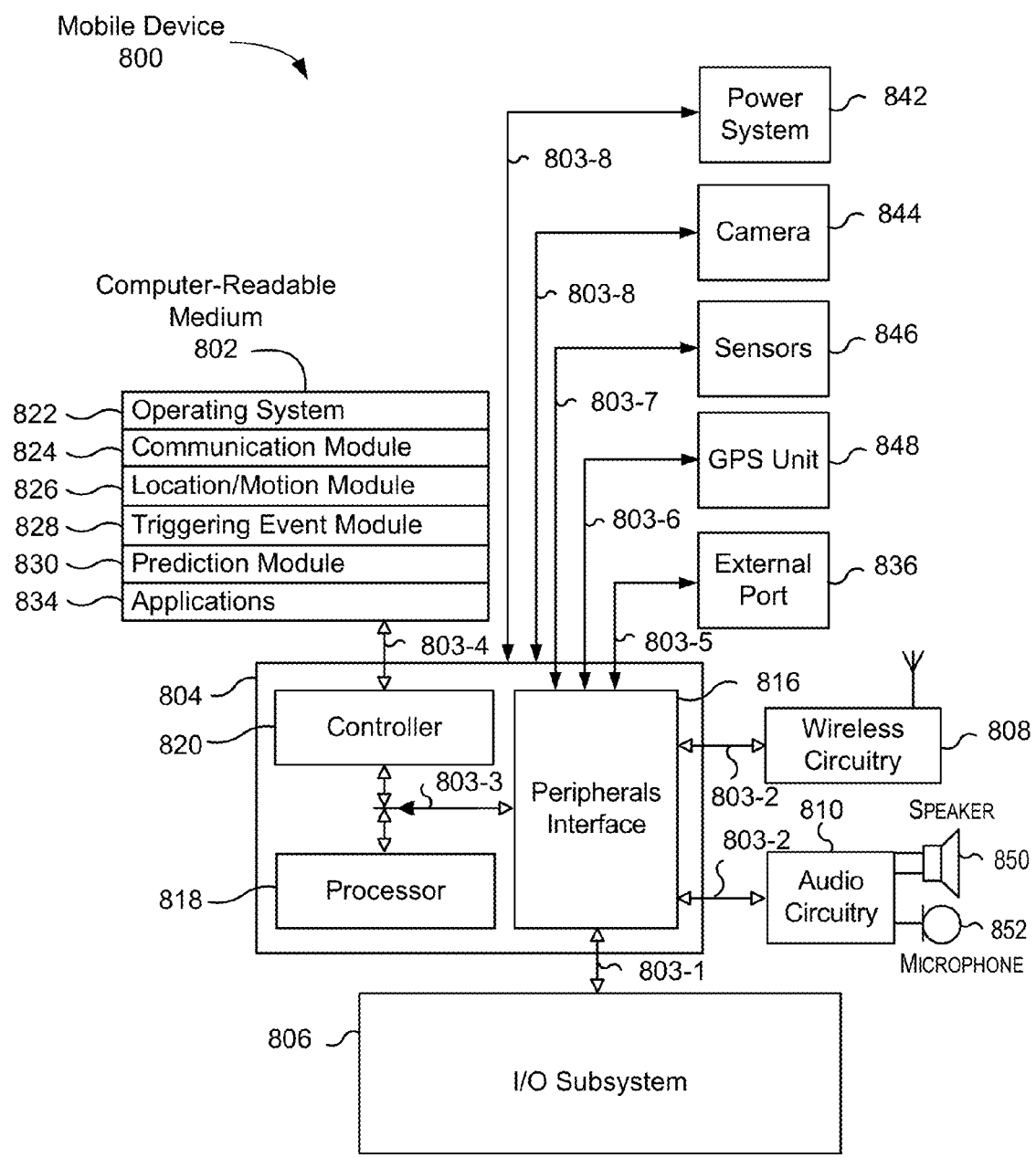
FIG. 8 is a block diagram of an example device according to embodiments of the present invention.

FIG. 8 is a block diagram of an example device 800, which may be a mobile device. Device 800 generally includes computer-readable medium 802, a processing system 804, an Input/Output (I/O) subsystem 806, wireless circuitry 808, and audio circuitry 810 including speaker 850 and microphone 852. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 7 is only one example of an architecture for device 800, and that device 800 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 808 can use various protocols, e.g., as described herein.

Wireless circuitry 808 is coupled to processing system 804 via peripherals interface 816. Interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of the device to processor 818 and computer-readable medium 802. One or more processors 818 communicate with computer-readable medium 802 via a controller 820. Computer-readable medium 802 can be any device or medium that can store code and/or data for use by one or more processors 818. Medium 802 can include a memory hierarchy, including cache, main memory and secondary memory.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module (or set of instructions) 824, a location module (or set of instructions) 826, a triggering event module 828, a prediction module 830, and other applications (or set of instructions) 834, such as a car locator app and a navigation app.

Operating system 822 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., USB, FireWire, Lightning connector, 60-pin connector, etc.) is adapted for coupling directly to other devices or indirectly over a network (e.g., the Internet, wireless LAN, etc.).

Location/motion module 826 can assist in determining the current position (e.g., coordinates or other geographic location identifier) and motion of device 800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 72826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

Triggering event module 828 can include various sub-modules or systems, e.g., as described herein with respect to FIG. 2. Furthermore, prediction module 830 can include various sub-modules or systems, e.g., as described herein with respect to FIG. 3.

The one or more applications 834 on the mobile device can include any applications installed on the device 800, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or track pad. In some embodiments, I/O subsystem 806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A computer-implemented method for providing a user interface to a user for interacting with a suggested application executing on a computing device, the method comprising, at the computing device:
   detecting an event at an input device of the computing device;
   determining that the event corresponds to one of a group of triggering events designated for identifying one or more suggested applications;
   selecting a first prediction model corresponding to the event, wherein the first prediction model is selected from a plurality of prediction models, and wherein the first prediction model corresponds to at least one triggering event that is different from another triggering event corresponding with a second prediction model of the plurality of prediction models;
   receiving contextual information about the computing device, the contextual information specifying one or more properties of the computing device for a first context;
   identifying, by the first prediction model, a set of one or more applications that have at least a threshold probability of being accessed by the user when the event occurs in association with the first context, the first prediction model using historical interactions of the user with the computing device after the event is detected;
   providing the user interface to the user for interacting with the set of one or more applications.

2. The method of claim 1, wherein detecting the event at the input device of the computing device comprises:
   detecting a connection of the computing device to an accessory device.

3. The method of claim 2, wherein the accessory device includes headphones or a computer of a vehicle.

4. The method of claim 1, wherein the contextual information specifies a location of the computing device.

5. The method of claim 1, wherein the user interface allows interactions on a screen with fewer applications than provided on a home screen of the computing device.

6. The method of claim 1, wherein detecting the event at the input device of the computing device comprises:
   detecting a movement of the computing device with one or more motion sensors; and
   determining a motion state of the computing device based on the movement, wherein the one of the group of triggering events designated for identifying the one or more suggested applications includes the motion state of the computing device.

7. The method of claim 1, wherein the second prediction model is selected from the plurality of prediction models when the other triggering event is detected, the other triggering event being different than the event, wherein the second prediction model is different than the first prediction model.

8. The method of claim 1, wherein the set of one or more applications includes a plurality of applications, and wherein the set of one or more applications as a whole has a probability greater than a threshold probability.

9. The method of claim 1, wherein the user interface is provided on a lock screen of the computing device, the user interface allowing selection of one of the set of applications from the lock screen.

10. The method of claim 1, further comprising running the set of one or more applications, the user interface being specific to the one or more applications being run.

11. The method of claim 1, wherein the one or more properties include at least one of: a location of the computing device, a time of day determined by the computing device, and a day of year determined by the computing device.

12. The method of claim 1, further comprising:
   determining whether a threshold period of time has elapsed;
   removing the user interface when it is determined that the threshold period of time has elapsed;
   determining whether the user seeks to access the set of one or more applications when it is determined that the threshold period of time has not elapsed; and
   running the set of one or more applications when it is determined that the user seeks to access the set of one or more applications.

13. The method of claim 12, wherein the threshold period of time is shorter for triggering events that involve direct user interaction than for triggering events that do not involve direct user interaction.

14. The method of claim 1, wherein the first prediction model corresponds to more than one event of the group of triggering events.

15. The method of claim 1, wherein each of the plurality of prediction models corresponds to a different triggering event.

16. A computer product comprising a non-transitory computer readable medium storing a plurality of instructions that when executed control a device including one or more processors, the instructions comprising:
   detecting an event at an input device of the device;
   determining that the event corresponds to one of a group of triggering events designated for identifying one or more suggested applications;
   selecting a first prediction model corresponding to the event, wherein the first prediction model is selected from a plurality of prediction models, and wherein the first prediction model corresponds to at least one triggering event that is different from another triggering event corresponding with a second prediction model of the plurality of prediction models;
   receiving contextual information about the device, the contextual information specifying one or more properties of the device for a first context;
   identifying, by the first prediction model, a set of one or more applications that have at least a threshold probability of being accessed by the user when the event occurs in the first context, the first prediction model using historical interactions of the user with the device when the event is detected;
   providing a user interface to the user for interacting with the set of one or more applications.

17. The computer product of claim 16, wherein detecting the event at the input device of the device comprises:
   detecting a connection of the computing device to an accessory device.

18. A device comprising:
   a triggering events storage for storing triggering events;
   an historical storage for storing historical data;
   one or more input devices;
   one or more contextual sources; and
   one or more processors configured to:
      detect an event at the one or more input devices;
      determine that the event corresponds to one of a group of triggering events designated for identifying one or more suggested applications;
      select a first prediction model corresponding to the event, wherein the first prediction model is selected from a plurality of prediction models, and wherein the first prediction model corresponds to at least one triggering event that is different from another triggering event corresponding with a second prediction model of the plurality of prediction models;
      receive contextual information about the device from the one or more contextual sources, the contextual information specifying one or more properties of the computing device for a first context;
      identify, by the first prediction model, a set of one or more applications that have at least a threshold probability of being accessed by the user when the event occurs in the first context, the first prediction model using historical interactions of the user with the computing device when the event is detected;
      provide a user interface to the user for interacting with the set of one or more applications.

19. The device of claim 18, wherein the one or more input devices includes at least one of a headphone jack, a Bluetooth device, a button, a touch screen, an accelerometer, and a GPS.

20. The device of claim 18, wherein the triggering events are predetermined events.

21. The device of claim 18, wherein the user interface allowing interactions with fewer applications than provided on a home screen of the computing device.

22. The device of claim 18, wherein the set of one or more applications includes a plurality of applications, and wherein each of the plurality of applications has a probability greater than a threshold probability.

* * * * *